Jan. 23, 1968   F. J. DAVENPORT   3,364,639
INSULATION PANEL
Filed Dec. 28, 1965
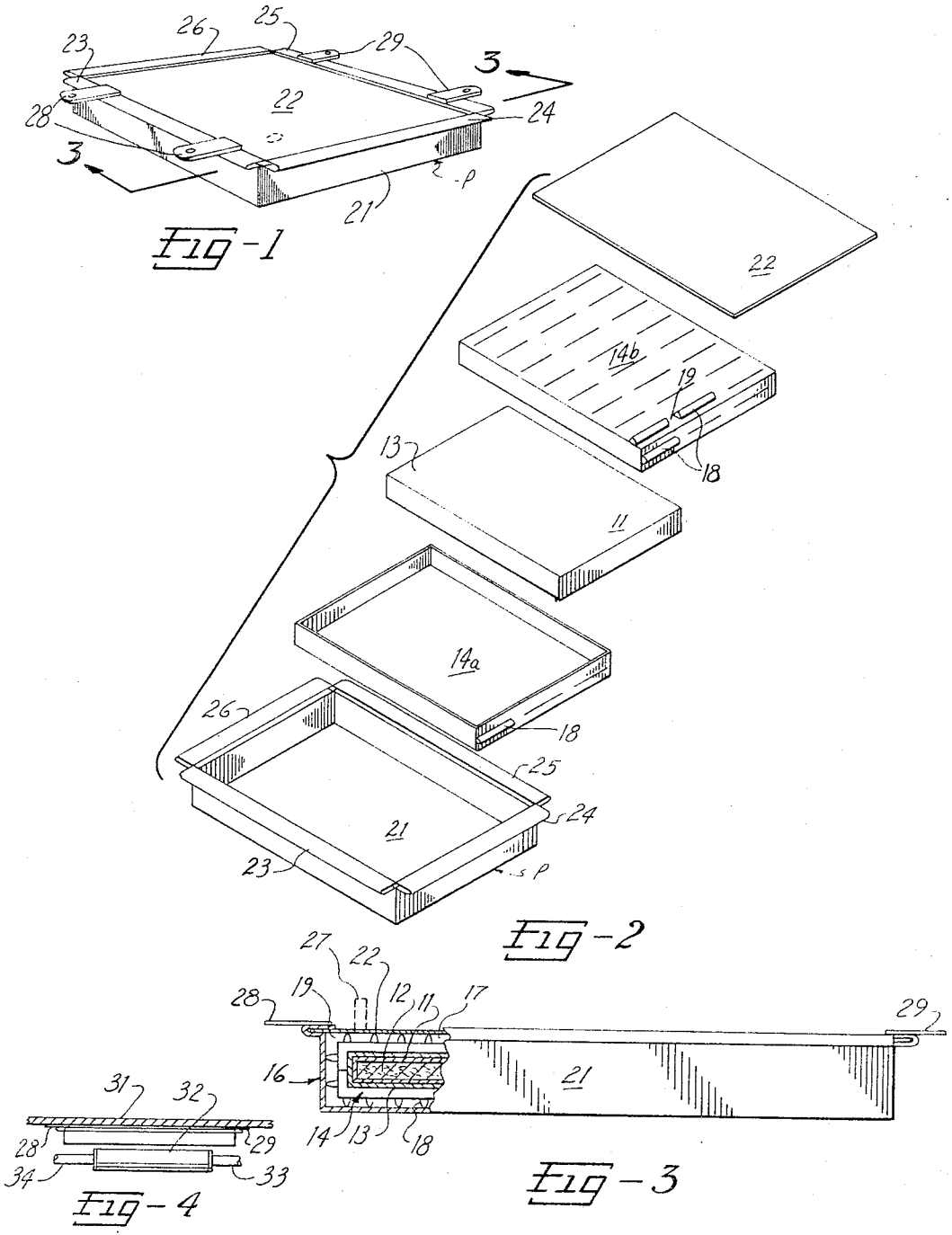
INVENTOR
FRED J. DAVENPORT
BY *T. Russell Foster*
ATTORNEY

United States Patent Office 3,364,639
Patented Jan. 23, 1968

3,364,639
INSULATION PANEL
Fred J. Davenport, Rte. 4, Box 316,
Newberry, S.C. 29108
Filed Dec. 28, 1965, Ser. No. 518,755
5 Claims. (Cl. 52—309)

ABSTRACT OF THE DISCLOSURE

An insulation panel comprising an outer enclosure, an inner enclosure, spacing projections on the inner enclosure, a vacuum between the inner and outer enclosure and a core of insulating material within said inner enclosure.

This invention relates to insulation devices and more particularly to an insulation panel utilizing a combination of materials for installation in areas of the type having a localized source of heat.

Many insulation materials are available today which serve adequately to insulate against heat. Such insulating materials are frequently required to be of substantial thickness for proper heat insulation and consequently are high in cost. In addition, such thick materials occupy considerable space so as to impose a severe limitation when used in structures where space is at a premium. Although insulating materials having increased insulating properties for a given thickness are constantly being developed, the required material thickness of such materials in many installations is still excessive and frequently combinations of various insulating materials are employed in an effort to reduce the required thickness and at the same time increase the heat insulating qualities. Such combinations of materials are frequently assembled in the form of a panel or the like for insulating relatively large areas.

Although such present day insulation panels have achieved some degree of success in the desired end result, materials employed in such panels are still relatively high in cost and require expensive manufacturing operations limiting their usefulness. Furthermore, the thickness of such panels required for the desired degree of heat insulation is often excessive for specific applications wherein the space for accommodating such panels is relatively limited. For instance, it has been proposed to utilize a heat insulation panel in automobiles as insulation against engine heat and the like wherein space, weight and cost factors have imposed severe limitations on panels constructed of present day materials utilizing present day manufacturing operations.

Accordingly, a primary object of this invention is to provide a new and novel insulation panel.

Another object of this invention is to provide an insulation panel manufactured from relatively inexpensive materials assembled in a relatively thin construction for insulation in areas where space is at a premium.

A further object of this invention is to provide a new and novel insulation panel containing a unique combination of insulating materials which is characterized by an unusually high degree of heat insulating property.

This invention further contemplates the provision of a new and novel insulation panel having a high insulating property which may be manufactured in a simple, easy and inexpensive manner to provide a low cost structure which may be easily installed in areas having a localized source of heat such as in an automobile where insulation against engine heat, muffler heat and the like is desired.

Other objects and advantages of the invention will become apparent from the following description taken in connection with the accompanying drawing.

The objects stated above and other related objects in this invention are accomplished by providing an outer enclosure of rigid material preferably metallic material within which is located an inner enclosure of rigid material preferably a resinous material. Means are provided for maintaining these inner and outer enclosures in uniformly spaced relationship which may be projections on the outer surface of the inner enclosure engageable with the inner surface of the outer enclosure. Thus, the inner and outer enclosure define therebetween an air space which is evacuated to form a vacuum insulating space. A core of insulating material is provided within the inner enclosure which is preferably a fibrous filler such as glass fiber surrounded by at least one layer of asbestos sheet material to form an insulation panel. The insulation panel may be installed in areas having a localized source of heat such as an automobile having heat generating units such as the engine, muffler or the like.

The novel features which are believed to be characteristic of the invention area set forth with particularity in the appended claims. The invention itself, however, both as to its organization and method of operation may be best understood by reference to the following description taken in conjunction with the accompanying drawing in which:

FIGURE 1 is a perspective view of the insulation panel of the invention;

FIGURE 2 is an exploded view of the insulation panel of FIGURE 1 showing the various component parts;

FIGURE 3 is an enlarged view partially in section taken substantially along line 3—3 of FIGURE 1 in the direction of the arrows; and FIGURE 4 is a side view illustrating the panel of the invention in an installed position.

Referring now to the drawing, there is shown in FIGURE 1 an insulation panel constructed in accordance with the invention which is designated generally by the reference character P. The panel P is constructed of a plurality of insulating materials combined in a novel manner to form an insulation panel which may be installed in any suitable location to insulate against a localized source of heat.

Referring now to FIGURES 2, 3, the insulation panel P includes a central core 11 which may be of any suitable thickness in accordance with the insulation requirements of the panel P. It should be understood, however, that the core 11 is relatively thin as the novel combination of materials in the panel P give the desired novel insulating results without excessive thicknesses.

In the specific embodiment illustrated, the core 11 includes a fibrous filler 12 of high insulating material such as glass fibers preferably in a foamed condition. As shown in FIGURE 3, the glass fibers filler 12 is substantially rectangular in cross-sectional shape. The glass fibers filler 12 is wrapped with at least one layer 13 of asbestos sheet material and in the preferred embodiment, two layers of asbestos sheet material are wrapped around the filler 12. As shown, the layers 13 of asbestos material preferably cover all of the surfaces of the fibrous filler 12 so that the filler 12 is completely enclosed.

In order to improve the insulating properties of the core 11, the glass fiber filler 12 wrapped with the layers 13 of asbestos sheet material is heated prior to assembly preferably to approximately 400 degrees Fahrenheit for a period of approximately 10 minutes to drive off moisture from these materials. As a result of this heating process, the core 11 is placed in a relatively dry state with attendant improved heat insulating properties.

The glass fiber filler 11 is then placed in snug fitting relationship within an inner enclosure 14 of rigid material preferably a thermoplastic resin. As shown in FIGURE 1, the inner enclosure 14 may be formed by molding the enclosure in two half sections 14a, 14b into which the core 11 is placed with the two half sections 14a, 14b in edgewise engagement. The abutting edges of the enclosure half sections 14a, 14b may be suitably sealed together by heat sealing or the like to form a sealed inner enclosure 14.

An outer enclosure 16 of rigid material preferably of metal is provided into which the inner enclosure 14 containing the core 11 is positioned and means are provided for maintaining the inner and outer enclosures 14, 16 in uniformly spaced relationship to form an air space 17 as shown in FIGURE 3. More specifically, a plurality of uniformly spaced outwardly projecting ridges 18 are formed preferably integrally on the surfaces of the inner enclosure 14 as shown best in FIGURE 3. These projections 18 having spaces 19 therebetween extend upwardly from the underlying surfaces of inner enclosure 14 for preferably approximately ¼ of an inch. In the assembled relationship, the projections 18 engage the inner surface of the outer enclosure 16 and maintain the outer enclosure 16 in uniformly spaced relationship with the surfaces of the inner enclosure 14 to form the air space 17.

The outer enclosure 16 which is preferably formed of metal such as steel of approximately 28 gage includes a pan section 21 and a substantially flat cover section 22. If desired, however, the outer enclosure 16 may be made from a resinous material such as the material of the inner enclosure 14 where exposure to heat, corrosive chemicals and the like is excessive. As shown best in FIGURE 1, the cover 22 is connected to the pan 21 by folded edges 23-26 which are sealed by welding or the like to completely seal the outer enclosure 16 after the core 11, and inner enclosure 14 have been positioned within the pan 21.

In order to increase the heat insulating property of the panel P, the air space 17 formed by the inner and outer enclosures 14, 16 is evacuated in any well-known manner. This evacuation may be accomplished by the use of a suitable pipe or conduit shown in dotted lines in FIGURE 3 through which a vacuum is applied to the air space 17 after the container component parts of the panel P have been assembled as described above. When the space 17 has been evacuated, the pipe 27 is removed and the opening in the outer enclosure 16 sealed so that an evacuated layer is between the inner and outer enclosures 14, 16 provided throughout the panel P.

In order to attach the panel P to a structure adjacent a localized source of heat which is to be insulated, suitable attaching means such as clips 28, 29 are provided on the panel P as shown best in FIGURE 3. FIGURE 4 shows the panel P installed in an automobile and connected to the automobile floor board 31 by means of the clips 28, 29. The panel P thus insulates the passengers on the other side of the floor board 31 from a localized source of heat such as a muffler 32 to which pipes 33, 34 are connected in the conventional manner.

It can be seen that there has been provided with this invention a novel insulation panel used to insulate against a localized source of heat which uses a combination of materials in a novel manner so as to provide a relatively thin insulation structure. Thus, not only is complete insulation from the heat source obtained but the panel of the invention may be installed in an area where space is limited such as in an automobile for insulation against engine heat, muffler heat and the like. The panel of the invention may be inexpensively manufactured from readily available material and also may be easily installed in a quick and easy manner where heat insulation is required. As the insulation panel of the invention is completely sealed, it need not be repaired if damaged but may be easily replaced inexpensively or may even be shifted to other locations with very little installation effort.

While there has been described what is presently considered to be the preferred embodiment of the invention, it will be understood by those skilled in the art that various changes and modifications may be made therein without departing from the invention and, therefore, it is the aim of the appended claims to cover all such changes and modifications as fall within the true spirit and scope of the invention.

Having thus described the invention, what is claimed is:

1. An insulation panel comprising, in combination, an outer enclosure of rigid material, an inner enclosure of rigid material, means for maintaining said inner and outer enclosures in uniformly spaced relationship to form an air space, said air space being evacuated to form a vacuum insulating space and a core of insulating material within said inner enclosure.

2. An insulation panel in accordance with claim 1 wherein said core of insulating material includes a fibrous filler of heat insulating material and at least one layer of asbestos sheet material surrounding said fibrous filler.

3. An insulation panel in accordance with claim 1 wherein said means for maintaining said inner and outer enclosures in uniformly spaced relationship include a plurality of projections on the outer surface of said inner enclosure arranged to engage the inner surface of said outer enclosure.

4. An insulation panel for shielding a passenger accommodating area from a heat generating unit in an automobile comprising, in combination, an outer enclosure of rigid material, an inner enclosure of rigid material, means for maintaining said inner and outer enclosures in uniformly spaced relationship to form an air space, said air space being evacuated to form a vacuum insulating space, a core of insulating material within said inner enclosure and means on said outer enclosure for attaching said insulation panel to a portion of said automobile between said heat generating unit and said passenger accommodating area.

5. An insulation panel comprising, in combination, an outer enclosure of metallic material, an inner enclosure of resinous material, a plurality of projections formed integrally on the outer surface of said inner enclosure engageable with the inner surface of said outer enclosure to maintain said inner and outer enclosures in uniformly spaced relationship to form an air space, said air space being evacuated to form a vacuum insulating space, a fibrous filler of heat insulating material in said inner enclosure and at least one layer of asbestos sheet material surrounding said fibrous filler in said inner enclosure.

References Cited
UNITED STATES PATENTS

| | | | |
|---|---|---|---|
| 2,123,869 | 7/1938 | Walker | 52—406 |
| 2,927,437 | 3/1960 | Rae | 220—10 X |
| 3,161,265 | 12/1964 | Match | 52—615 |

JOHN E. MURTAGH, *Primary Examiner.*